United States Patent Office 3,850,976
Patented Nov. 26, 1974

3,850,976
PROCESS FOR THE PRODUCTION OF UNSATURATED ALDEHYDE CYANHYDRINS
Chisei Shibuya, Oi-machi, Shunji Ouchi, Tokyo, and Shigeyoshi Hayashi, Asaka, Japan, assignors to Deutsche Gold- und Silber-Scheideanstalt vormals Roessler, Frankfurt, Germany
No Drawing. Filed Apr. 27, 1973, Ser. No. 355,020
Claims priority, application Japan, May 15, 1972, 47/47,228
Int. Cl. C07c 121/02
U.S. Cl. 260—465.6   7 Claims

ABSTRACT OF THE DISCLOSURE

Process for the production of cyanhydrins of unsaturated aldehydes in high yield. The reaction is carried out in the presence of solid ammonium salts such as ammonium carbonate, ammonium bicarbonate and ammonium carbamate, or in the presence of a mixture of ammonia and carbon dioxide.

BACKGROUND OF THE INVENTION

This invention relates to the process for the preparation of unsaturated aldehydes with hydrogen cyanide in the presence of ammonia and carbon dioxide or of selected ammonium salts.

Cyanhydrins are a well known reactive class of compounds which are useful for various chemical syntheses, particularly the synthesis of amino acids.

However, cyanhydrins are very unstable compounds having a tendency to decompose or polymerize in the course of the reaction by which they are formed or upon elevation to the high temperatures necessary for separation by distillation even under reduced pressure. They are especially unstable under alkaline condition.

Various methods of stabilization have heretofore been proposed. For example by the use of acids such as sulfuric acid, phosphoric acid (U.S. Pat. 2,537,814), monochloracetic acid (U.S. Pat. 2,623,896); iodine (U.S. Pat. 2,416,624); halides, such as ammonium chloride, copper chloride, calcium chloride (Japanese patent publication No. 6209/1965) or copper salts such as copper sulfate, copper acetate, copper naphthenate (Japanese patent publication No. 12859/1966).

These methods, however, have not been completely satisfactory and the art has long sought economical procedures capable of producing the desired products in yields of over 80%.

THE INVENTION

A method has now been discovered in accordance with this invention which can be used to produce cyanhydrins of unsaturated aldehydes containing up to three carbon atoms in yields of over 80%, and even as high as 95% or higher.

In accordance with the process of the invention the selected aldehyde is reacted with hydrogen cyanide, preferably employed in a slight molar excess (for example up to 10% molar excess based on the aldehyde) at a temperature of from about −50° C. to +30° C. preferably −30° C. to +30° C. in a reaction inert polar organic solvent in the presence of catalytic quantities of a solid ammonium salt or of a mixture of carbon dioxide and ammonia. The presently preferred ammonium salts are ammonium carbonate, ammonium bicarbonate and ammonium carbamate.

The action of the ammonium salts or of the mixture of ammonia and carbon dioxide is most suprising, especially in view of the previously recognized instability of cyanhydrins in alkaline media. While the use of the gaseous mixture is preferred for convenience, it has been observed that the use of the solid catalysts also leads to yields above 80%. The gaseous mixture can be formed by bubbling the gases into the reaction media or by previously heating the ammonium salt above its decomposition temperature. Alternatively, the solid ammonium salts can be simply included in the reaction media.

For example, the gaseous mix can be blown into a polar organic solvent such as a lower alkanol, a dialkyl formamide or a dialkyl sulfoxide, wherein the alkyl group preferably contains up to two carbon atoms. Mixtures of solvents can be employed if desired. The preferred solvents for the preparation of the catalytic media are methanol, ethanol, dimethyl formamide and dimethyl sulfoxide. Those skilled in the art, however, will recognize that the solvents mentioned are only illustrative and that a wide variety of other solvents such as acetonitrile or tert-butanol may be equally effective. While it is generally preferred to use the same solvent for the reaction as for the preparation of the catalytic medium, it is not necessary to do so.

In a typical procedure for the preparation of the gaseous mix by decomposing a solid ammonium salt, 20 gr. of ammonium carbonate were taken up in 80 ml. of methanol and heated in an autoclave at 60° C. for thirty minutes. The time require for the preparation of the catalytic media can be reduced by increasing the temperature, for example to about 80° C.

The ammonium salts or the mixture of ammonia and carbon dioxide are employed in catalytic quantities. The amounts employed generally vary from about 0.5 to ten mol percent based on the mols of unsaturated aldehydes. Some variation beyond this range can be tolerated without adverse effect, although such variation is rarely necessary. The preferred range, in consideration of economy and yields is from 1 to 3 mol percent.

The mode of action of the solid ammonium salts is not completely understood. They do not appear to decompose and yet their action is essentially equivalent to the action of the ammonia-carbon dioxide mix. The reaction therefore can be said to take place in the presence of catalytic quantities of ammonia and carbon dioxide or of compounds containing the elements of these materials. The most effective solid catalysts are those which are capable of decomposing when heated to generate these products.

Typical unsaturated aldehydes which can be employed in the practice of this invention are acrolein, methacrolein and crotonaldehyde. While it is expected that the invention will be most useful with these aldehydes because their cyanhydrins are widely utilized in organic synthesis, the invention is not so limited and may be practiced with other unsaturated aldehydes, both straight and branch chained containing up to three carbon atoms.

The reaction can be carried out either batchwise or in a continuous manner.

The reaction period may vary within very wide limits ranging from as low as 20 seconds to as high as 60 minutes. The optimum time for each reaction will depend upon such factors as the selected aldehyde, the catalyst, the temperature and other factors recognized by those skilled in the art. For most reactions, the preferred range is from 1 to 30 minutes.

It has been observed that the yields are somewhat improved if the reaction mixture is acidified at the end of the reaction period. It is not necessary to do so however. While a number of acids can be employed for such acidification, the presently preferred acids are sulfuric and phosphoric acids.

The following, non-limiting examples are given by way of illustration only.

EXAMPLE 1

6.5 g. of ammonium carbonate and 54 ml. of methanol were placed in an autoclave having a capacity of 100 ml. The resulting mixture was heated with stirring at 80° C. for 0.5 hour. After cooling the resulting mixture to room temperature, a clear solution was obtained.

247 ml. of acrolein (purity of 97%) were added to the mixture of 800 ml. of methanol, 150 ml. of hydrogen cyanide and the foregoing clear solution. The mixture was kept at −30° C. for 30 minutes. After completing the reaction, the reaction mixture acidified with phosphoric acid. The methanol was removed by distillation. The residue was distilled under reduced pressure to give a 94.5% yield of acrolein cyanhydrin (boiling point: 65° C./3 mm. Hg).

Comparative Example 30 gram of hydrogen cyanide, 200 ml. of methanol and 1 g. of potassium cyanide were charged into a flask having a capacity of 500 ml. equipped with stirrer and dropping funnel and then 28 g. of acrolein were added at 0° C. over a period of 30 minutes.

After the addition of acrolein, the reaction mixture was continuously stirred while adding the following stabilizers in the usually recommended amounts (0.1 to 2% by weight based on acrolein). The methanol was removed. The residue was distilled under reduced pressure. The results are shown in the following table.

| Stabilizer: | Percent yield of acrolein cyanhydrin |
|---|---|
| Sulfuric acid | 77 |
| Acetic acid | 70 |
| Monochloro acetic acid | 80 |
| Iodine | 72 |
| Copper sulfate | 0 |
| Copper chloride | 0 |
| Copper nitrate | 0 |
| Ammonium chloride | 58 |
| Calcium chloride | 45 |

Comparative Example

The procedure of Example 1 was repeated except that pyridine was used in place of the methanol-ammonium carbonate clear solution. The yield of acrolein cyanhydrin obtained was no more than 79%.

EXAMPLE 2

65 ml. of acrolein (purity of 85%) were added over a period of 30 minutes to a mixture of 43 ml. of hydrogen cyanide and 14 ml. of a solution which was prepared from 4.8 g. of ammonium carbonate and 40 ml. of methanol following by the same procedure as described in Example 1 while holding the temperature at −20° C. for an additional hour.

One half of the reaction mixture was acidified with sulfuric acid and the methanol removed under reduced pressure. The yield based on charged acrolein was 95.8%.

The remaining portion was similarly treated except that acidification was omitted. The yield was 86.1%.

Similar results are obtained with methacrolein and croton aldehyde.

Comparative Example

The same procedure as described in Example 2 was repeated except that 1.5 g. of sodium hydroxide was used in place of ammonium carbonate. After removing low boiling materials from the reaction mixture, an attempt was made to remove acrolein cyanhydrin by distillation. However, practically no distillate was obtained. Instead, the reaction mixture solidified to give red-brownish material which could not be further distilled.

EXAMPLE 3

10 ml. of methanol and 1.7 g. of liquid ammonia were charged into an autoclave having a capacity of 200 ml. Carbon dioxide was absorbed into the mixture while stirring at room temperature under a pressure of 25 atmosphere to give a methanol solution containing both gases. 58 g. of acrolein (purity 97%) were added with stirring over a period of 30 minutes to a solution containing 43 ml. hydrogen cyanide, 100 ml. of methanol and 30 ml. of above prepared methanol solution while maintaining the temperature at 0° C.–5° C. After the addition of acrolein, stirring was continued for an additional 30 minutes at −20° C. The reaction mixture was acidified with phosphoric acid and the methanol was removed. The residue was distilled under reduced pressure to give 93.5% yield of acrolein cyanhydrin.

EXAMPLE 4

50 g. of acrolein (purity of 97%) were added with stirring over a period of one hour to 100 ml. of an ethanol solution containing 1.95 g. of ammonium carbamate and 43 ml. of hydrogen cyanide at 0° C.–5° C. After the addition of acrolein, reaction mixture was further stirred to a short period, and then was acidified with concentrated sulfuric acid. The reaction product was treated in the same procedure as described in Example 1 to give 75 g. (yield of 90.5%) of acrolein cyanhydrin.

EXAMPLE 5

70 g. of croton aldehyde (purity of 97%) were added with stirring over a period of one hour to a solution containing 43 ml. of hydrogen cyanide, 200 ml. of methanol, and 14 ml. of a solution which was prepared from 4.3 g. of ammonium carbonate and 40 ml. of methanol utilizing the procedure of Example 1 while cooling to 0° C.–5° C.

After completion of the addition of croton aldehyde, reaction mixture was stirred at room temperature for an additional 30 minutes and acidified with concentrated sulfuric acid. The reaction product was treated by the same procedure as described in Example 1 to give 88.5 g. (yield of 91.1%) of croton aldehyde cyanhydrin.

EXAMPLE 6

A clean solution containing 6.5 g. of ammonium carbonate, 152 ml. of hydrogen cyanide, 800 ml. of methanol and a separate solution containing 247 ml. of acrolein (purity of 93%) in 700 ml. of methanol were separately introduced into the inlet of a spiral type reaction tube by the use of quantitative pump. The dwell time in the reactor was 20 seconds at 20° C.

The resulting reaction mixture was treated as described in Example 1 to give 95% yield of acrolein cyanhydrin.

What is claimed is:

1. A process for the production of cyanhydrins of aldehydes selected from the group consisting of acrolein, methacrolein and crotonaldehyde which comprises reacting the aldehyde with an excess of hydrogen cyanide at a temperature of from about −50° C. to +30° C. in a reaction inert, polar organic solvent in the presence of a catalytically effective quantity of ammonia and carbon dioxide or of a compound which decomposes on heating to form ammonia and carbon dioxide.

2. A process according to Claim 1 wherein said compound is selected from the group consisting of ammonium carbonate, ammonium bicarbonate and ammonium carbamate.

3. A process according to claim 1 wherein a catalytic media is formed by heating a compound which generates ammonia and carbon dioxide in a polar solvent and the aldehyde and hydrogen cyanide are reacted in a polar solvent containing this media.

4. A process according to Claim 1 wherein a polar organic solvent is selected from the group consisting of lower alkanols, dialkyl formamides and dialkyl sulfoxides containing up to two carbon atoms.

5. A process according to Claim 4 wherein a polar organic solvent is selected from the group consisting of methanol, ethanol, dimethyl formamide and dimethyl sulfoxide.

6. A process according to Claim 1 wherein the amount of catalyst employed is from 0.5–10 mol percent based on unsaturated aldehyde.

7. A process according to Claim 1 including the additional step of acidifying the reaction mixture at the end of the reaction.

References Cited

UNITED STATES PATENTS 2,101,823  12/1937  Dittmar _____ 260—465.6

OTHER REFERENCES

Rehberg et al. C. A. 42 (1948), pp. 4938–4939.

JOSEPH P. BRUST, Primary Examiner